United States Patent
Vanhuysse et al.

(10) Patent No.: US 6,276,173 B1
(45) Date of Patent: Aug. 21, 2001

(54) COVERING FOR STRUCTURES THAT COME INTO CONTACT WITH GLASS OBJECTS DURING THEIR MOULDING PROCESS

(75) Inventors: Boudewijn Vanhuysse, Oosterzele; Wim Van Steenlandt, Sint-Niklass, both of (BE)

(73) Assignee: N.V. Bekaert S.A., Zwevegem (BE)

(*) Notice: Subject to any disclaimer, the term of this patent is extended or adjusted under 35 U.S.C. 154(b) by 0 days.

(21) Appl. No.: 09/355,619

(22) PCT Filed: Feb. 18, 1998

(86) PCT No.: PCT/EP98/00908

§ 371 Date: Aug. 2, 1999

§ 102(e) Date: Aug. 2, 1999

(87) PCT Pub. No.: WO98/37029

PCT Pub. Date: Aug. 27, 1998

(30) Foreign Application Priority Data

Feb. 20, 1997 (BE) .................................................. 9700154

(51) Int. Cl.⁷ ............................. C03B 35/20; C03B 40/00
(52) U.S. Cl. ...................... 65/374.12; 65/374.1; 428/605
(58) Field of Search ................................... 428/605, 608, 428/606, 613; 65/374.1, 374.11, 374.12, 374.13, 374.14, 355, 356

(56) References Cited

U.S. PATENT DOCUMENTS

| | | | |
|---|---|---|---|
| 3,741,743 | 6/1973 | Seymour | 65/287 |
| 3,815,197 | 6/1974 | Sukenik | 29/132 |
| 3,852,862 | 12/1974 | Sukenik | 29/132 |
| 4,066,450 * | 1/1978 | Takeuchi et al. | 75/229 |
| 4,169,622 * | 10/1979 | Claassen et al. | 294/118 |
| 4,221,579 * | 9/1980 | Wright et al. | 65/114 |
| 4,290,889 * | 9/1981 | Erikson | 210/484 |
| 4,678,495 | 7/1987 | Yoshizawa | 65/287 |
| 4,828,932 * | 5/1989 | Morimoto et al. | 428/608 |
| 4,906,271 | 3/1990 | D'Iribarne et al. | 65/273 |
| 5,022,906 | 6/1991 | Vanaschen et al. | 65/268 |
| 5,069,703 | 12/1991 | D'Iribarne et al. | 65/104 |
| 5,088,919 * | 2/1992 | De Bruyne et al. | 431/328 |
| 5,183,491 | 2/1993 | D'Iribarne et al. | 65/104 |
| 6,063,332 * | 5/2000 | Imamura et al. | 419/4 |

FOREIGN PATENT DOCUMENTS

| | | |
|---|---|---|
| 3908642C1 * | 3/1990 | (DE). |
| 0 312 439 | 4/1989 | (EP). |
| 0 373 992 | 6/1990 | (EP). |
| 94427 | 8/1969 | (FR). |
| 2 134 218 | 8/1984 | (GB). |
| 2 186 279 | 8/1987 | (GB). |
| 3-157141 * | 7/1991 | (JP). |
| 94/14608 | 7/1984 | (WO). |
| WO 94/01372 * | 1/1994 | (WO). |

OTHER PUBLICATIONS

English languagae translation of German Patentschrift DE 3908642 C1, published Mar. 1990.*

* cited by examiner

Primary Examiner—John J. Zimmerman
(74) Attorney, Agent, or Firm—Foley & Lardner

(57) ABSTRACT

The invention relates to a contact member or covering (1) for covering structures (4,9) that come into contact with glass objects (12) during their forming process. The covering is a relatively compact non-woven fiber web (2) with apertures (10) and comprised of randomly oriented fibers which are composed, for example, of stainless steel. This covering can, for example, be used to cover tempering and pressure rings which are used in the process of forming glass plates.

12 Claims, 2 Drawing Sheets

COVERING FOR STRUCTURES THAT COME INTO CONTACT WITH GLASS OBJECTS DURING THEIR MOULDING PROCESS

BACKGROUND

The invention relates to a contact member for covering structures that come into contact with glass objects during their moulding process: in general, during the transport of the glass throughout the entire process, and more in particular also during the phase involving the actual moulding and tempering of the moulded glass.

The contact member or covering according to the invention can for example be used to cover the support rings (pressure and tempering rings) used for shaping and/or tempering car glass sheets, i.e. windows for vehicles. In addition, the covering can also be used for covering the means by which the glass (or glass object) is lifted to move it, for example, between the different phases of the forming process. The actual moulding means, such as for example the pressure moulds, can also be covered with the covering. These applications will be explained below, with emphasis on the numerous advantages offered by the use of a covering according to the invention in the different situations.

In essence there are three basic process phases or steps that can be distinguished in the glass forming process as a whole: the actual shaping of the glass, in particular of glass plates, the transport, and the tempering of the glass after it has been shaped.

Different processes are known. The glass is heated in an oven to the shaping temperature. The shaping itself then occurs, for example, by pressing the glass using a form or mould and a ring, or using two moulds that are mounted either horizontally or vertically. Next, the glass—often supported by a ring—can be transferred to the tempering zone, where the glass, whether supported by the same ring or not, is cooled by air.

Another process consists in producing the forming or shaping of the glass through the mere action of gravity on the hot glass, which again is supported by a ring. This method is referred to as "gravitational bending" or "gravitational sag" method.

In what follows, the pressure and tempering rings referred to above will be designated hereafter in general as support rings. The term "support ring" should therefore be broadly interpreted in the present description: it relates to any ring which comes into contact with the glass, even if only for a brief time and no matter what the position of the ring may be in relation to the glass.

The support rings are often provided with a covering to avoid the adverse effects of direct contact between the glass and the steel ring. Such coverings are subject to a great diversity of requirements. For example, the covering must be sufficiently thermally insulating, and during the hot moulding process the covering should leave as few imprints or marks on the glass as possible, and preferably none at all. Moreover, the (perforated) covering should have a large air permeability in order not to shield the glass too much during tempering.

The support ring is conventionally covered, for example, with one or more layers of metal mesh, as described in the American U.S. Pat. No. 3,741,743. Although the ring is often serrated/toothed or perforated in order not to shield the glass too much from the air during tempering, the air permeability of the covered ring is often still insufficient because the perforations or the serrated gaps are closed by the covering. In addition, the deformability and thermal resistance of the aforementioned meshes also turn out to be insufficient in practice. Thus the covering can be fitted only with great difficulty to certain complex mould forms and only a brief glass/ring contact can be permitted. However the shapes that manufacturers want to impart to glass are becoming increasingly complex, so that—as a consequence—the required contact time between glass and ring during pressing is increasing.

In the European patent EP 0312439 a metallic covering is proposed which is constructed of oriented metal fibres and has an essentially mesh-shaped structure. Thus, for example, a woven or knitted metal fibre cloth is used which is fixed on the (perforated or serrated) support ring, either directly on the support ring or with a metal mesh interbetween.

SUMMARY OF THE INVENTION

Some disadvantages are associated with the use of such a covering for a broad range of moulding requirements. The stitches, the crossings of the yarns and the like, which are intrinsically present in the fabric, can press into the glass surface during the hot moulding process, which results in imprints and defects. As a result of the very open structure of the fabric, it can also happen that the underlying metal mesh or the ring itself can come into contact with the glass which is being shaped through the mesh holes of the fabric. Again this can result in marks on the glass surface.

Furthermore, the metallic covering—and also the mesh, when present—cover the perforations or serrated teeth of the ring, so that they partially lose their function, which is to promote the flow of air during the tempering process. The use of a coarser mesh has a positive effect on the air permeability, but in turn results in an even more frequent contact between mesh and glass. In the covering of the support ring with the fabric, it is stretched over the ring. Due to unevenness in the tension, the porosity (and hence the permeability to air) of the covering is modified in a fairly uncontrollable manner, which could give rise to irregular tempering properties. Indeed, two identical coverings can never be stretched over the ring entirely in the same manner.

The pressure moulds for the shaping of the glass are also provided with a covering. The American U.S. Pat. No. 4,678,495 describes the use of a needle felt for covering the press moulds. The layered structure proposed contains fibres made of at least two different materials, namely steel and composite fibers, as well as aramid or carbon fibers.

The use of a needle felt for covering moulds involves a few significant drawbacks. For example, a non compressed needle felt according to the state of the art is so soft that after a number of pressing operations it never recovers its original volume. The pressing thus changes in an irreversible manner the thickness of the covering so that the characteristics of each moulded glass object are different and deviate from the preset design characteristics. Moreover, the fibers in a non precompressed needle felt are held together only by mutual entanglement, which makes a needle felt much less wear resistant, for example, than a precompressed or sintered web.

The glass transportation means can also be provided with a covering in order to avoid the adverse effects of direct contact with the glass (or glass object). By creating an underpressure or vacuum, the glass is sucked up against the underside of the transportation means in order then to move it, for example, to a subsequent phase of the shaping or forming process. A perforated ceramic or cast steel block which is extremely flat along the side where it is in contact with the glass is often used as a transportation means here. Conventionally, this block is covered on this side with fiberglass paper, a fiberglass fabric or a fabric made of stainless metal fiber yarn. Stone particles that have come loose from the block can then, for example, get stuck between the fabric and the underside of the block. These trapped stone particles result in an embossed surface or imprints during the hot moulding of the glass. This problem is totally avoided through the use of the contact member according to the invention that, because of its substantial rigidity, fits closely to the surface of the mould.

It is an object of the invention to avoid these drawbacks by providing a contact member for covering structures that come into contact with glass objects in the course of their moulding process. The contact member consists of a relatively compact eg. a sintered web composed of randomly oriented fibers which by preference are made of stainless steel. In particular the invention relates to a covering for moulding members for glass objects comprising a relatively compact non woven fiber web with apertures therein which coincide with the gaps in the underlying mould member.

BRIEF DESCRIPTION OF THE DRAWINGS

The invention and certain of its applications and uses will be explained now in detail, with attention being given to the many advantages linked to its use, and with reference to the attached drawings.

DESCRIPTION OF THE PREFERRED EMBODIMENTS

Figure 1:
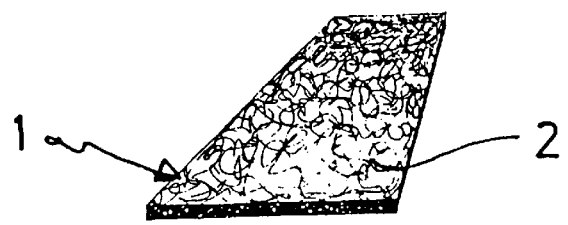
FIG. 1 is a schematic representation of the contact member according to the invention.

The contact member or covering 1 according to the invention is a relatively compact web 2 composed of substantially randomly oriented fibers. The random direction of the fibers imparts uniform, directionally independent thermal and mechanical properties to the covering, which results in the covering having a longer lifetime. The web 2 is provided with apertures 10 which coincide with the gaps 11 in the adjacent mould member (ring 4 or male mould 9).

According to the invention the relatively compact webs are to be understood to include sintered fiber webs and/or compressed needle-punched fiber webs. The degree of compaction to produce said compact webs should thereby result in coverings with a compression factor of below 20% after 100 compression cycles as explained below. This compression factor should even preferably be below 15%, even below 11% and most preferably below 5%. The consolidation of the non woven web by needle punching includes besides a conventional needling operation also the densification by a set of air or water jets.

By preference, stainless steel fibres (for example, of types such as FeCralloy®, NiCralloy®, Aluchrome®, Hastelloy®, or of the AISI type steels 347, 316L, 316, 302 or 304) are used, having an equivalent diameter of between 1 and 100 $\mu$m. The diameter of the fibers, moreover, is by preference between 8 and 60 $\mu$m. The "equivalent diameter of a fiber" is the diameter of an imaginary round fiber having the same cross-sectional area as the actual fiber.

When the compacted web is a sintered web, the sintering of the metal fiber web can be done in an oven, or by means of a continuous sintering operation under pressure, as described in patent application WO 94/14608 of the applicant. The thickness of such sintered web is less than 10 mm and preferably less than 5 mm even less than 3 mm in most cases.

The covering according to the invention has a heat transmission resistance of more than $10^{-3}$ m$^2$.K/W. By preference, this heat transmission resistance is greater than $10^{-2}$ m$^2$.K/W. The heat transmission resistance is the quotient of the thickness of the product divided by the thermal conductivity coefficient.

The permeability of the contact member is strongly dependent on its thickness, as is apparent from the following examples of embodiments of the contact member according to the invention.

The examples in the table below relate to a metal fiber web comprising FeCralloy® fibers having an equivalent diameter of 22 $\mu$m. The properties reported are the thickness D of the covering, the heat transmission resistance R and the air permeability $\Psi$ at a pressure drop of 200 Pa over the product.

|  | Example 1 | Example 2 |
| --- | --- | --- |
| D (mm) | 1.05 | 2.10 |
| R (m$^2$ .K/W) | 0.038 | 0.044 |
| $\Psi$ (L/min/dm$^2$) | 900 | 235 |

Moreover, the sintered structure according to the invention can also be provided with a coating for the purpose of meeting specific requirements that may be imposed upon the covering for a particular application.

In addition, ceramic or polyaramid fibers can also be utilized instead of metal fibers. Such fibers can, for example, also be used as a high temperature resistant filler in the web.

Figure 2:
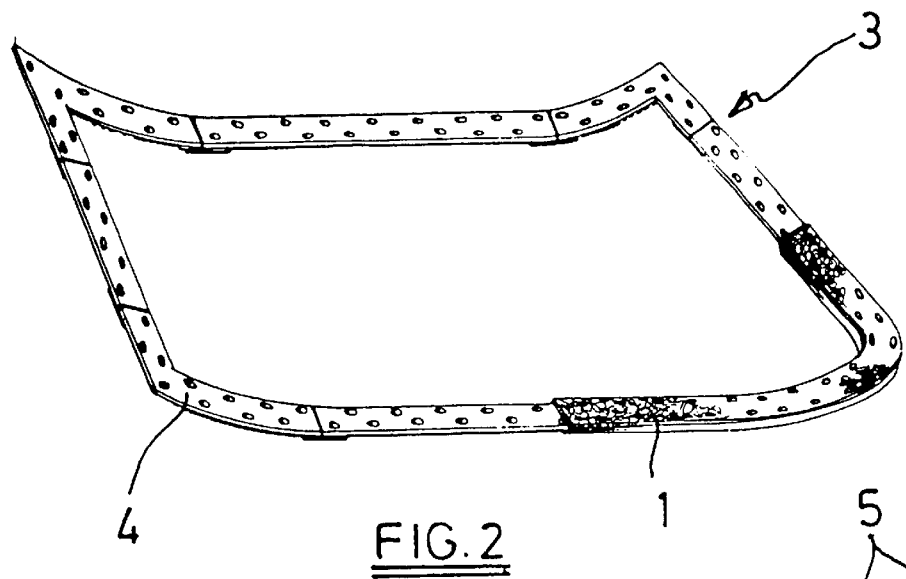
FIG. 2 illustrates the use of the contact member as a covering for a support ring.
Figure 3:
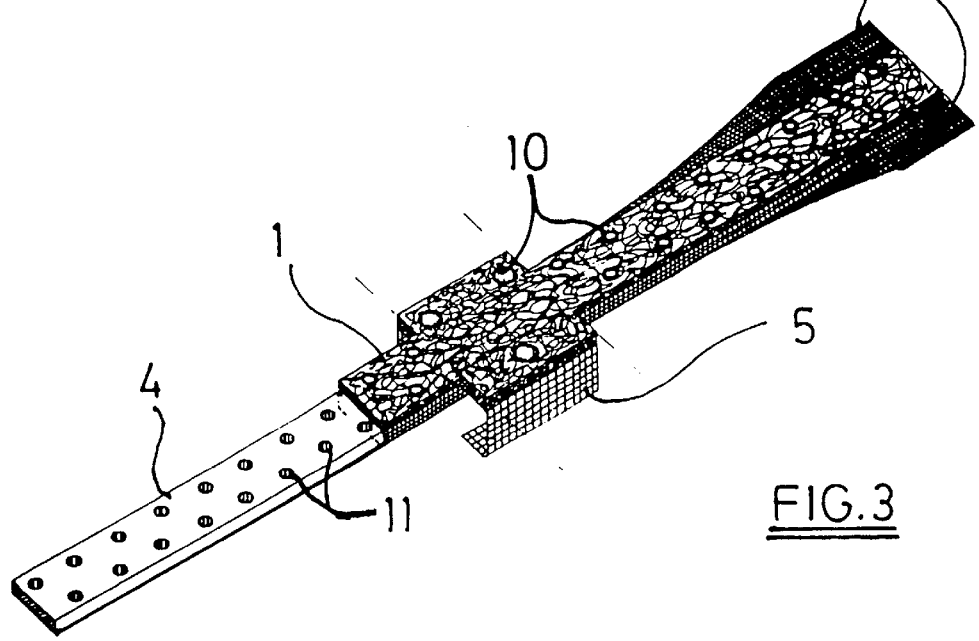
FIG. 3 represents schematically how the contact member according to the invention can be attached to a support ring.

As a concrete example of an application of the invention, the covering of a support ring for glass plates for car windows will be explained below with reference to FIGS. 2 and 3.

As already mentioned above, a support ring 3 for glass is utilized in the pressing, transporting and/or tempering of the glass. During the entire forming process the glass is supported either by the same ring or by more than one ring, depending on the process embodiment in question.

The base ring 4 onto which the covering 1 is attached is made of a heat-resistant material such as stainless steel and may or may not be serrated/toothed or perforated. Thus the base ring 4, for example, is (partially) provided with circular perforations 11 having a diameter of 0.5 to 1 cm. The covering 1 is often also perforated in a manner wherein the holes 10 correspond and coincide with the perforations in the base ring 4, as schematically illustrated in FIGS. 2 and 3. If the support ring 3 is utilized only in the pressing of the glass, then the base ring will usually be constructed of non-perforated pieces.

The covering 1 can be attached in various simple ways to the base ring 4, which can have a fairly complex form. In a first phase, the covering 1 can for example be attached to a metal mesh or expanded metal sheet 5. This can be done by means of sintering in an oven or by continuous sintering under pressure as described in patent application WO 94/14608 of the applicant. In the case of a compressed needle punched fiber sheet, the fibers can be entangled and fixed to the metal mesh during the needling operation. In a second phase, the metal mesh or expanded metal 5 can then be attached to the base ring 4 with a heat-resistant glue or by means of roller or spot welding, or by bending the free parts of the metal mesh or expanded metal 5 towards the underside of the base ring 4, as shown in FIG. 3, where a segment of the ring has been enlarged in order to visualize the intended section more clearly. "Free parts" should be understood to mean those parts of the metal mesh or expanded metal 5 that are not covered by the contact member 1.

One alternative involves attaching the covering in a mechanical manner to the base ring, for example by means of screws and/or threads which are partially passed through the sintered web and are clamped to the underside of the base ring.

The covering according to the invention resists to the high moulding temperature and to the high pressures that occur during the pressing of the glass. In addition, the new covering is very wear-resistant and has a greater insulating factor than the conventional coverings.

Moreover, the high permeability of the (perforated) covering also makes the ring very suitable as a support ring for the glass during tempering. In view of the substantial rigidity of the sintered or otherwise compacted web, the entire surface of the adjacent structure 4, 6 or 9 is always covered with this web. Thus any contact between the glass and the adjacent structure is totally excluded, which is not the case in the use of conventional coverings of the type described in the European patent EP 0312439.

In the case where the support ring 3 acts solely as a carrier upon which the glass is tempered, the sintered or otherwise compacted metal fiber web can itself be utilized as a carrier instead of as a covering for an adjacent ring structure.

As an alternative to the support ring as described above, a ring covered with a sintered or otherwise compacted metal fiber web can be covered further with a knitted metal structure over this compacted fiber web. In this embodiment the metal meshes of the conventional support rings are thus replaced by the (either perforated or non-perforated) compacted material. Thus, by eliminating the metal meshes all danger of the glass being marked by these meshes is excluded.

Furthermore, it is also possible to fix the covering according to the invention by means of sintering, for example, to a strip, for example, of stainless steel. A layered structure is thus obtained which in itself can be used as a support ring.

As previously mentioned, a relatively thick metal fiber web can also itself be sintered or compacted through a combined needle punching and compression. Whether or not reinforced with one or more metal meshes, the structure thus obtained can then be used as a support ring for the glass.

Figure 4:
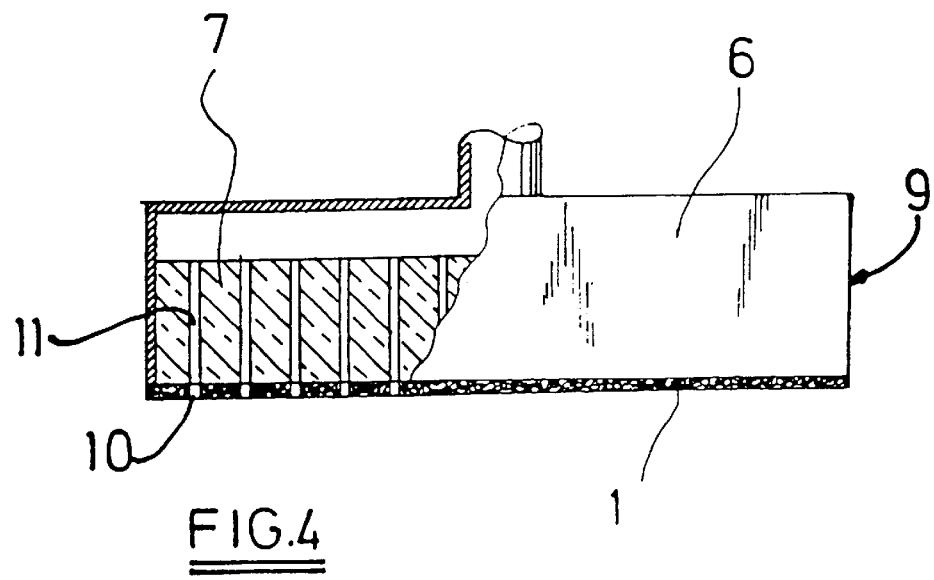
FIG. 4 shows schematically how glass transportation means can be covered with the contact member according to the invention.

The covering according to the invention can, as previously mentioned, also be used for covering the means 6 with which the glass (or glass object) is transported. FIG. 4 shows schematically how the transportation means 6, for example a perforated ceramic or metallic transportation block 7, can be covered with the covering 1 according to the invention.

Figure 5:
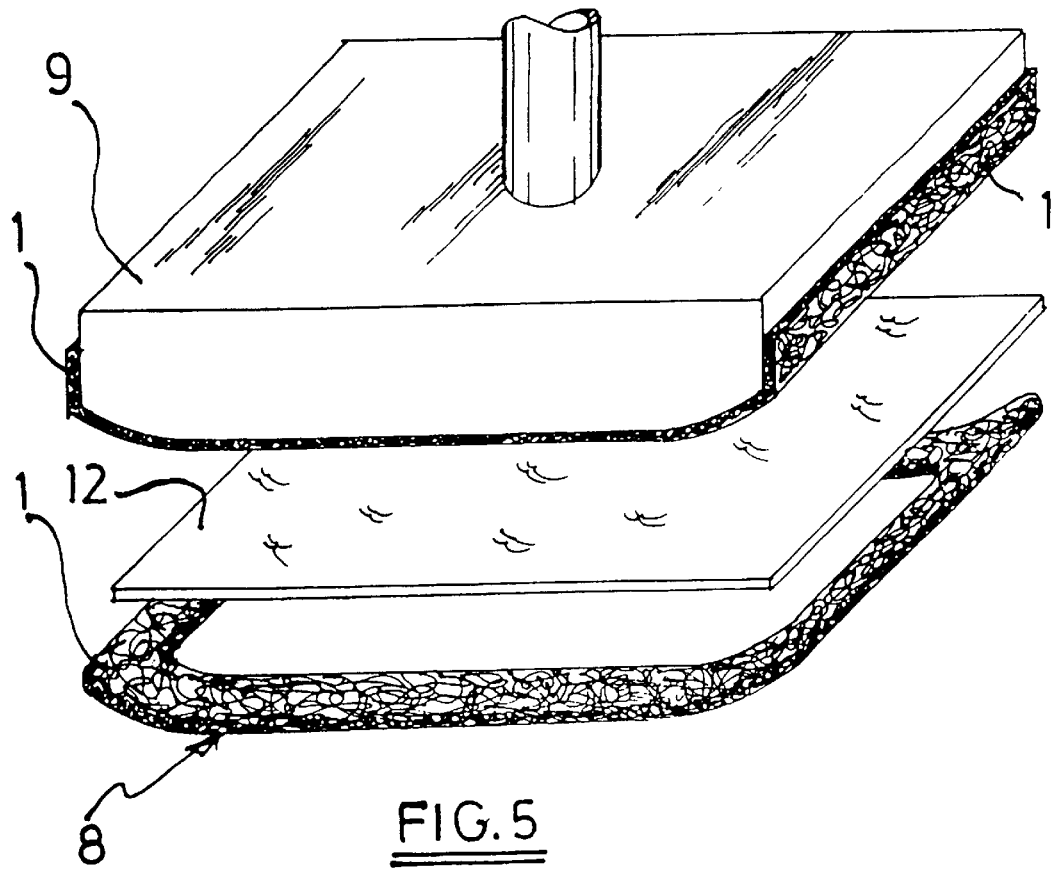
FIG. 5 is a schematic representation of a pressure mould and a pressure ring covered with the contact member according to the invention.

The use of the contact member 1 according to the invention for covering the moulds 6, 9 and rings 3 which are used in the (horizontal or vertical) pressing of the glass has also been previously mentioned. In the horizontal pressing of the glass, a full male mould 9 is often used in combination with a pressure ring 8. Both the mould 9 and the pressure ring 8 can then be covered with the covering 1 according to the invention. This is illustrated in FIG. 5.

The use of the contact member according to the invention thus plays a crucial role in the manufacture of a glass plate (or glass object) of perfect optical quality.

The compression factor (%) for the compacted webs mentioned before and its significance for the invention will now be explained with reference to an example.

It is important for the moulding process, as described above, that the coverings, after a number of compression cycles, recover their original volume of the previous cycle. A non compacted needle felt is too soft to enable such full recovery.

The following cyclic compression operation was designed to determine the structural features for the covering between which an acceptable recovery potential can be produced. Compacted webs A, B and C and a non compacted needle felt D were submitted to 100 compression cycles wherein the forces and degrees of compression were measured. In each cycle the maximum pressure was set at 2 N/mm$^2$.

Let us assume that the thickness of a fresh covering, before its first compression cycle is 100%. After having it compressed during 100 cycles (with a pressure rising up in each cycle to 2 N/mm$^2$) the thickness has decreased to a permanent degree of say 5%. The compression factor is herein defined as this percentage of decrease in thickness.

EXAMPLE

The table below shows now the results of the cyclic compression experiment wherein A is a sintered metal fiber web, B is a compressed and needled stainless steel fiber felt, C is another compressed and needled stainless steel fiber felt and D is a non compressed and needled stainless steel fiber felt each time with the indicated weight and thickness.

The metal fibers used in the webs B, C and D are stainless steel fibers (316 L) with a diameter of 12 $\mu$m.

|   | thickness (mm) | weight g/m$^2$ | compression factor (%) |
|---|---|---|---|
| A | 2.2 | 3000 | 6.3 to 11 |
| B | 1.8 | 1700 | 1.6 |
| C | 3.5 | 3700 | 11–13 |
| D | 2.5 | 1850 | 33 |

It is clear from this table that a precompressed needle felt B or C or a sintered web A has a much lower compression factor than a non compressed needle felt after a number of cycles. This warrants more reliable and reproducible moulding and tempering conditions for the glass shaping process.

What is claimed is:

1. An article, comprising:
a glass mould member covering to cover a glass mould member, said glass mould member covering including a relatively compact non-woven fiber web having pores, said non-woven fiber web adapted to be fitted to a glass mould member; said non-woven fiber web further including apertures in said non-woven fiber web, said apertures being positioned to coincide with gaps of a glass mould member, wherein said non-woven fiber web has a thickness, said thickness decreasing permanently less than 20% after 100 compression cycles of 2 N/mm$^2$.

2. An article according to claim 1, wherein said thickness decreases permanently less than 11% after 100 compression cycles of 2 N/mm$^2$.

3. An article according to claim 1, wherein said non-woven fiber web is a needle felt comprising stainless steel fibers.

4. An article according to claim 1, wherein said non-woven fiber web is a sintered web comprising stainless steel fibers.

5. An article according to claim 1, wherein said non-woven fiber web has a thickness of less than 10 mm.

6. An article according to claim 1, wherein said non-woven fiber web has a thickness less than 5 mm.

7. An article according to claim 1, wherein said non-woven fiber web is combined with a metal wire mesh or expanded metal sheet.

8. An article, comprising:

a glass mould member, said glass mould member being covered by a non-woven fiber web, wherein said non-woven fiber web has a thickness, said thickness decreasing permanently less than 20% after 100 compression cycles of 2 N/mm$^2$.

9. An article according to claim 8, wherein the glass mould member includes gaps, said non-woven fiber web has pores and apertures, said apertures being positioned to coincide with said gaps of the glass mould member.

10. An article according to claim 8, wherein the glass mould member comprises a pressure mould.

11. An article according to claim 8, wherein the glass mould member comprises a glass transporting member.

12. An article according to claim 8, wherein the glass mould member comprises a tempering ring.

* * * * *